United States Patent
Lu et al.

(10) Patent No.: US 11,824,194 B2
(45) Date of Patent: Nov. 21, 2023

(54) METHOD FOR RAPIDLY PREPARING PRUSSIAN BLUE ANALOGUE WITH MONOCLINIC CRYSTAL STRUCTURE

(71) Applicant: Tsinghua University, Beijing (CN)

(72) Inventors: Yangcheng Lu, Beijing (CN); Yuming Xi, Beijing (CN)

(73) Assignee: Tsinghua University, Beijing (CN)

( * ) Notice: Subject to any disclaimer, the term of this patent is extended or adjusted under 35 U.S.C. 154(b) by 601 days.

(21) Appl. No.: 16/922,469

(22) Filed: Jul. 7, 2020

(65) Prior Publication Data
US 2021/0043932 A1  Feb. 11, 2021

(30) Foreign Application Priority Data
Aug. 7, 2019 (CN) .......................... 201910724111.X

(51) Int. Cl.
| | |
|---|---|
| *H01M 4/58* | (2010.01) |
| *C01C 3/12* | (2006.01) |
| *H01M 4/04* | (2006.01) |
| *H01M 4/02* | (2006.01) |

(52) U.S. Cl.
CPC .................. *H01M 4/58* (2013.01); *C01C 3/12* (2013.01); *H01M 4/0497* (2013.01); *C01P 2002/72* (2013.01); *C01P 2004/03* (2013.01); *C01P 2004/61* (2013.01); *C01P 2004/62* (2013.01); *C01P 2006/40* (2013.01); *H01M 2004/028* (2013.01)

(58) Field of Classification Search
None
See application file for complete search history.

(56) References Cited

FOREIGN PATENT DOCUMENTS

| | | | |
|---|---|---|---|
| CN | 106920964 A | 7/2017 | |
| CN | 107364874 A | 11/2017 | |
| CN | 107611404 A | 1/2018 | |
| CN | 109698345 A * | 4/2019 | .......... H01M 10/054 |

(Continued)

OTHER PUBLICATIONS

Machine translation of Liu et al., CN 107364874 A (Year: 2017).*

(Continued)

*Primary Examiner* — Coris Fung
*Assistant Examiner* — Keling Zhang
(74) *Attorney, Agent, or Firm* — Stites & Harbison PLLC; Patrick M. Torre

(57) ABSTRACT

The present invention discloses a method for rapidly preparing a Prussian blue analogue with a monoclinic crystal structure. The Prussian blue analogue with a monoclinic crystal structure has a chemical formula of $Na_xM[Fe(CN)_6]_y \cdot zH_2O$, where M=Mn or Fe, $1.5<x<2$, and $0.5<y<1$. In this method, a mixture of sodium ferrocyanide and sodium chloride is adopted as a solution A, and a solution of manganese salt or iron salt in water is adopted as a solution B; the solutions A and B are continuously and rapidly mixed by a micromixer, and the precipitation reaction is conducted to obtain a nano-precursor slurry; and the nano-precursor slurry is aged at 80° C. to 160° C. for 3 min to 2 h to obtain a Prussian blue analogue with a monoclinic crystal structure that has a particle diameter of 200 nm to 2,000 nm.

4 Claims, 3 Drawing Sheets

(56) References Cited

FOREIGN PATENT DOCUMENTS

CN 110224130 A * 9/2019 .......... H01M 10/054

OTHER PUBLICATIONS

Jiang et al., High-capacity and selective ammonium removal from water using sodium cobalt hexacyanoferrate, RSC Adv., 2018, 8, 34573 (Year: 2018).*

Rudola et al., Monoclinic sodium iron hexacyanoferrate cathode and non-flammable glyme-based electrolyte for inexpensive sodium-ion batteries, Journal of the electrochemical society, 164, 2017 (Year: 2017).*

Tan, Characterization of mixing in T- and Y-shaped mixing chambers using computational fluid dynamics, Delft University of Technology, Master's thesis (Year: 2002).*

Machine translation of Jiang CN 110224130 A (Year: 2019).*

Machine translation of Liu et al., CN 109698345 A (Year: 2019).*

Jia et al., Membrane-dispersion reactor in homogeneous liquid process, J. Chem. Technol. Biotechnol, 2013, 88, 163-168 (Year: 2013).*

Wu, X., et al., Highly Crystallized $Na_2CoFe(CN)_6$ with Suppressed Lattice Defects as Superior Cathode Material for Sodium-Ion Batteries, ACS Appl. Mater. Interfaces 2016, 8, pp. 5393-5399.

Li, W., et al., Multifunctional conducing polymer coated $Na_{1+x}MnFe(CN)_6$ cathode for sodium-ion batteries with superior performance via a facile and one step chemistry approach, Nano Energy (2015) 13, pp. 200-207.

You, Y., et al., Sodium iron hexacyanoferrate with high Na content as a Na-rich cathode material for Na-ion batteries, Nano Research 2015, 8(1): 117-128.

CN106920964A—English machine translation of Abstract.
CN107364874A—English machine translation of Abstract.
CN107611404A—English machine translation of Abstract.

* cited by examiner

METHOD FOR RAPIDLY PREPARING PRUSSIAN BLUE ANALOGUE WITH MONOCLINIC CRYSTAL STRUCTURE

This application claims priority to Chinese Patent Application Serial No. 201910724111. X filed on Aug. 7, 2019, the entirety of the contents of which is incorporated by reference herein.

TECHNICAL FIELD

The present invention belongs to the technical field of chemistry and chemical engineering, and in particular, relates to a method for preparing a Prussian blue analogue with a monoclinic crystal structure by rapid precipitation in a microreactor and high-temperature aging.

BACKGROUND

With the continuous exploitation of lithium resources worldwide, the lithium resource cost has remained high all the time, and lithium-ion batteries have gradually lost competitiveness in the field of large-scale energy storage. Sodium-ion batteries, compared with lithium-ion batteries, are advantageous in terms of cost, and have been promising in the field of large-scale energy storage and low-speed electric vehicles.

Among many sodium-ion cathode materials, the manganese-based/iron-based Prussian blue analogue ($Na_xM[Fe(CN)_6]_y \cdot zH_2O$, M=Mn or Fe) has promising prospects for development and application due to high voltage plateau, high specific capacity, low raw material cost, and simple synthesis methods. With a sodium content of x>1.6, the above Prussian blue analogue has a monoclinic crystal structure and white appearance, referred to as Prussian white for short. The interstitial water is removed from Prussian white by high temperature to obtain manganese-based/iron-based Prussian blue analogue ($Na_2M[Fe(CN)_6]$) with a rhombohedral structure and a theoretical specific capacity of 170 mAh/g that is comparable to a lithium iron phosphate cathode material in lithium batteries. In order to achieve a large-scale application in sodium-ion batteries, a large-scale and efficient method must first be developed for preparing high-quality Prussian blue analogues with a monoclinic crystal structure. However, a lot of coordinated water and $Fe(CN)_6$ defects are easy to be introduced into the product due to the extremely-fast reaction involved in the preparation of a Prussian blue analogue with a monoclinic crystal structure, resulting in a seriously low content of sodium. It requires a favorable process control manner to obtain a high-quality product, for example, $Fe(CN)_6$ defects are controlled by decreasing the precipitation rate and are eliminated by precipitation and aging. The precipitation rate is decreased mainly by introducing complexing agents and controlling the dropwise addition. Although there have been a large number of reports in references and patents, huge theoretical obstacles have been faced in industrial application. For example, in Nano Research 2015, 8(1): 117-128; Nano Energy (2015) 13, 200-207; ACS Appl. Mater. Interfaces 2016, 8, 5393-5399 and other documents, complexing agents are introduced, such as citric acid and sodium citrate. Metal ions are complexed with the complexing agents and slowly released during the reaction process to reduce crystal structure defects in the product. However, the introduction of complexing agents is bound to significantly increase the cost and remarkably reduce the production efficiency. The dropwise addition method is regulated by controlling the reactant concentration at the millimolar level and extending the dropwise addition time to more than ten hours, which results in an extremely-low production efficiency and the difficulty to ensure the batch-to-batch consistency in mass production.

Precipitation and aging is an effective method to eliminate coordinated water and increase sodium content, as described in CN 107611404, CN 106920964, CN 107364874, etc. As described in Chinese patent CN 107364874, the reactant is slowly added dropwise by a peristaltic pump to produce precipitates, then the resulting mixture is placed at 20° C. to 90° C. for 2 h to 10 h to obtain an intermediate, and the intermediate needs to react at a high temperature of 90° C. to 150° C. for 2 h to 24 h. This process, involving a two-step reaction at a high temperature, takes more than ten hours. The obtained Prussian blue analogue, with a chemical formula of $Na_{1.8}Mn_{0.4}Fe(CN)_6$, has a significantly-low content of manganese, and thus is not suitable as a sodium-ion cathode material with high specific capacity. Moreover, the long high-temperature aging time imposes a challenge on the temperature control of a large stirring tank. Inconsistent temperatures will cause a wide particle size distribution and a great impact on the application of the material.

In summary, none of the existing methods for preparing a Prussian blue analogue with a monoclinic crystal structure can achieve both the high quality of product and the high efficiency of process. Developing a method for rapidly preparing a Prussian blue analogue with a monoclinic crystal structure remains a significant and challenging task.

SUMMARY

The present invention belongs to the technical field of chemistry and chemical engineering, and in particular, relates to a method for preparing a Prussian blue analogue with a monoclinic crystal structure by rapid precipitation and high-temperature aging in a microreactor. The method includes the following steps:

1) preparing a mixture of sodium ferrocyanide and sodium chloride (or sodium sulfate or sodium nitrate) as a raw material A;
2) preparing a solution of manganous salt or ferrous salt as a raw material B;
3) rapidly mixing solutions A and B with a micromixer, and conducting precipitation reaction to obtain nano-precursor slurry C;
4) aging the precursor slurry C at 80° C. to 160° C. for 3 min to 2 h under a nitrogen or argon atmosphere; and
5) filtering out precipitates from the slurry C aged at a high temperature, and washing and drying the precipitates to obtain a Prussian blue analogue with a monoclinic crystal structure that has a particle diameter of 200 nm to 2,000 nm.

The above Prussian blue analogue with a monoclinic crystal structure has a chemical formula of $Na_xM[Fe(CN)_6]_y \cdot zH_2O$, where M=Mn or Fe, 1.5<x<2, and 0.5<y<1.

The manganous salt is one or a mixture of manganese chloride, manganese sulfate and manganese nitrate, and the ferrous salt includes one or a mixture of ferrous chloride, ferrous sulfate and ferrous nitrate.

In above raw material A, sodium ferrocyanide has a concentration of 0.05 mol/L to 1 mol/L, and sodium chloride has a concentration of 0.5 mol/L to 6 mol/L.

In above raw material B, manganous salt or ferrous salt has a concentration of 0.05 mol/L to 3 mol/L.

The raw material A (ferrocyanide) and raw material B (manganous salt/ferrous salt) are used at a molar ratio of 1:(0.5-3).

The micromixer is a micro structured mixer, including a membrane dispersion micromixer, a microsieved micromixer, a cocurrent microslot micromixer, a T-shaped mixer or the like.

The present invention has the following beneficial effects.

The present invention utilizes the excellent mixing property of the micromixer to ensure that the precipitation reaction is conducted at a highly-uniform concentration, and Prussian blue analogue nanoparticles that are highly-dispersed, uniformly-sized, highly-defective and nearly-spherical are obtained through explosive nucleation. During the high-temperature aging process, due to the high uniformity of the precursor nanoparticles, the crystal fusion and growth can be effectively carried out through a non-classical crystallization path. The coordinated water can be eliminated and $Fe(CN)_6^{4-}$ defects can be reduced in a relatively short time, and manganese-based/iron-based Prussian blue analogue particles having less defects/high sodium content are obtained, with a monoclinic crystal structure. In the present invention, compared with the conventional preparation method combining complex precipitation and controlled dropwise addition, the reactant concentration can be increased from the millimolar level to the molar level, and the preparation time can be reduced from dozens of hours to 1 h to 2 h. Therefore, the method of the present invention is suitable for large-scale production and has a promising application prospect.

DETAILED DESCRIPTION

Figure 1:
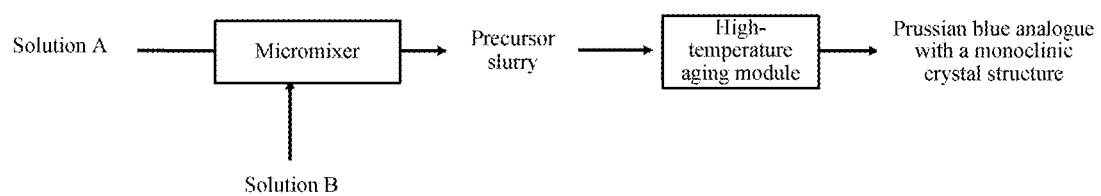
FIG. 1 is a flowchart of a process according to the present invention.
Figure 2:
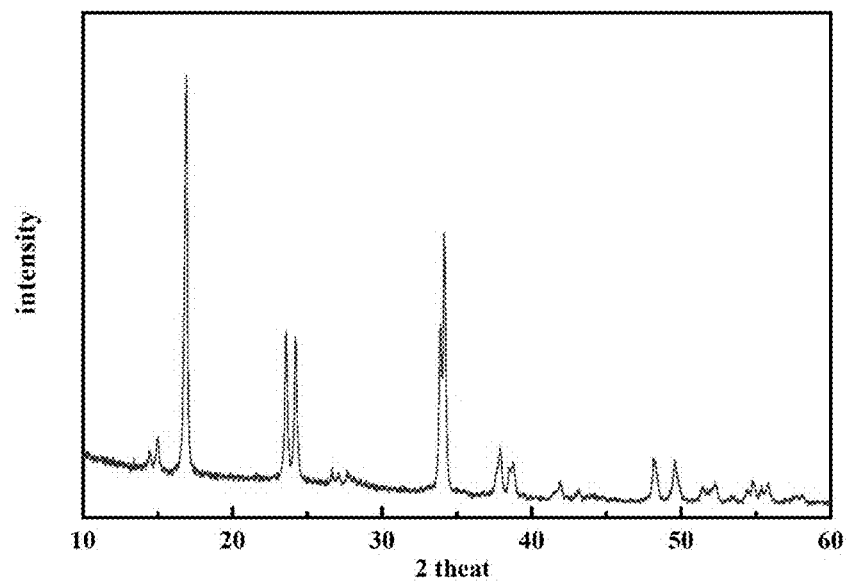
FIG. 2 is an X-ray diffraction pattern for the manganese-based Prussian blue analogue with a monoclinic crystal structure prepared in Example 1 of the present invention.
Figure 3:
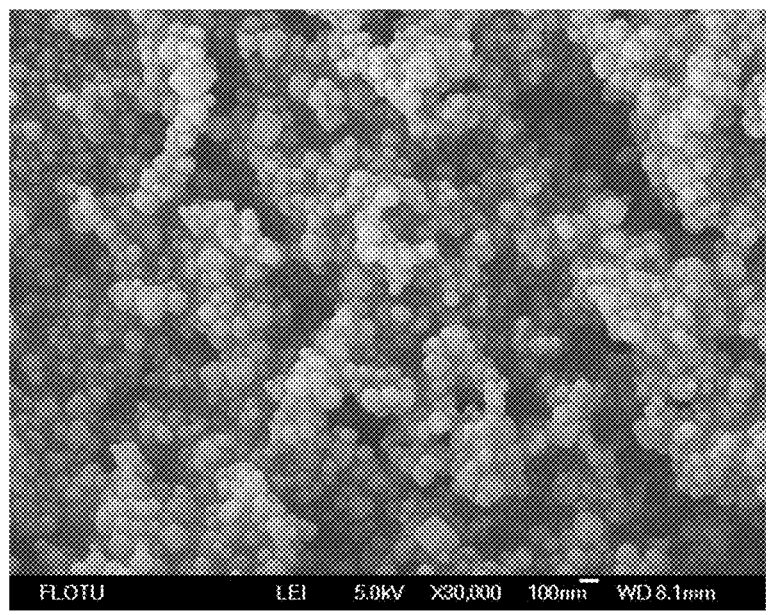
FIG. 3 is an SEM image for the precursor prepared in Example 1 of the present invention.
Figure 4:
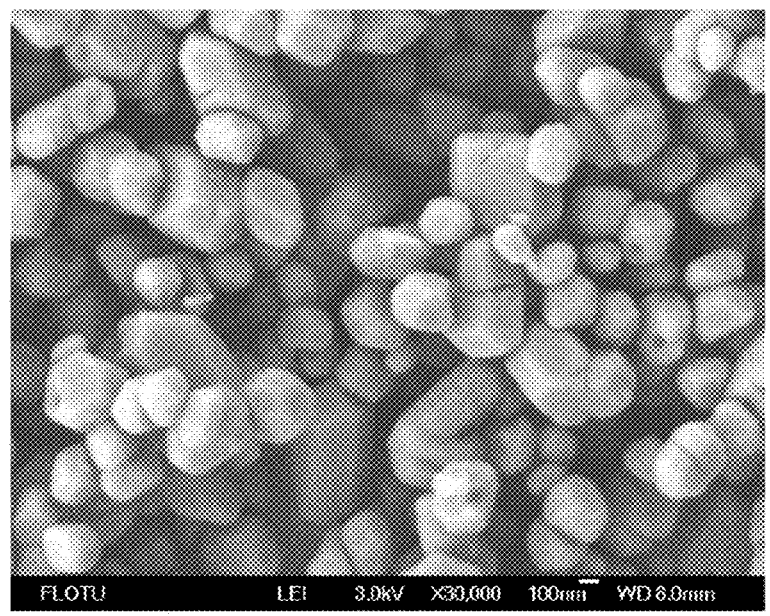
FIG. 4 is an SEM image for the manganese-based Prussian blue analogue with a monoclinic crystal structure prepared in Example 1 of the present invention.
Figure 5:
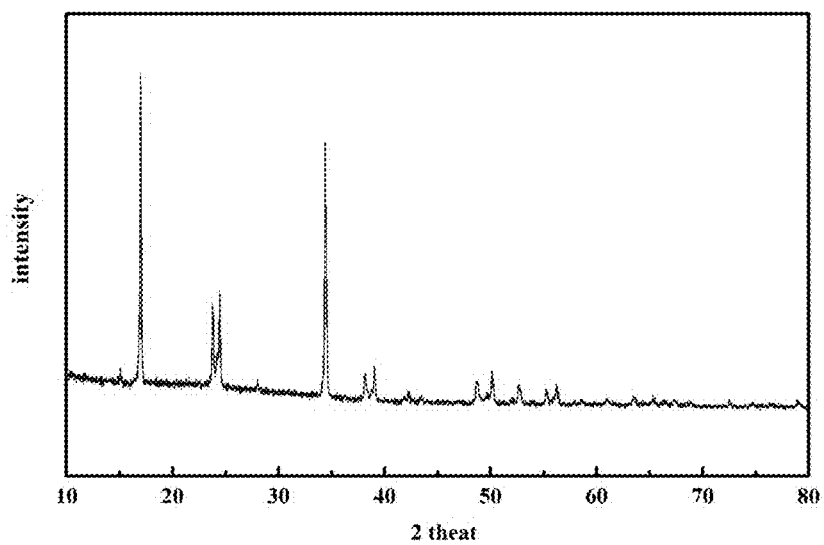
FIG. 5 is an X-ray diffraction pattern for the iron-based Prussian blue analogue with a monoclinic crystal structure prepared in Example 2 of the present invention.

The present invention is further described below with reference to the accompanying drawings and examples.

Example 1

An aqueous solution of 0.05 mol/L sodium ferrocyanide and 0.5 mol/L sodium chloride was prepared to obtain a raw material A. A solution of 0.15 mol/L manganese chloride was prepared to obtain a raw material B. 1 L of the raw material A and 1 L of the raw material B were rapidly mixed using a membrane dispersion microreactor to obtain slurry C. The slurry C was aged at a high temperature of 120° C. for 2 h. Precipitates were filtered out from the slurry C, then washed and dried to obtain a Prussian blue analogue with a monoclinic crystal structure, where Na:Mn:Fe=1.72:1:0.91.

Example 2

An aqueous solution of 1 mol/L sodium ferrocyanide and 6 mol/L sodium chloride was prepared to obtain a raw material A. A solution of 3 mol/L manganese chloride was prepared to obtain a raw material B. 1 L of the raw material A and 1 L of the raw material B were rapidly mixed using a microsieved micromixer to obtain slurry C. The slurry C was aged at a high temperature of 160° C. for 3 min. Precipitates were filtered out from the slurry C, then washed and dried to obtain a Prussian blue analogue with a monoclinic crystal structure, where Na:Mn:Fe=1.88:1:0.89.

Example 3

An aqueous solution of 0.6 mol/L sodium ferrocyanide and 2 mol/L sodium chloride was prepared to obtain a raw material A. A solution of 0.2 mol/L manganese chloride was prepared to obtain a raw material B. 1 L of the raw material A and 1 L of the raw material B were rapidly mixed using a T-shaped micromixer to obtain slurry C. The slurry C was aged at a high temperature of 80° C. for 1 h. Precipitates were filtered out from the slurry C, then washed and dried to obtain a Prussian blue analogue with a monoclinic crystal structure, where Na:Mn:Fe=1.65:1:0.84.

Example 4

An aqueous solution of 0.1 mol/L sodium ferrocyanide and 3 mol/L sodium chloride was prepared to obtain a raw material A. A solution of 0.1 mol/L ferrous chloride was prepared to obtain a raw material B. 1 L of the raw material A and 1 L of the raw material B were rapidly mixed using a membrane dispersion microreactor to obtain slurry C. The slurry C was aged at a high temperature of 140° C. for 2 h. Precipitates were filtered out from the slurry C, then washed and dried to obtain a Prussian blue analogue with a monoclinic crystal structure, where Na:Fe=0.96.

Example 5

An aqueous solution of 0.1 mol/L sodium ferrocyanide and 6 mol/L sodium chloride was prepared to obtain a raw material A. A solution of 0.05 mol/L ferrous chloride was prepared to obtain a raw material B. 1 L of the raw material A and 1 L of the raw material B were rapidly mixed using a T-shaped micromixer to obtain slurry C. The slurry C was aged at a high temperature of 100° C. for 1 h. Precipitates were filtered out from the slurry C, then washed and dried to obtain a Prussian blue analogue with a monoclinic crystal structure, where Na:Fe=0.92.

The technical solutions of the present invention are described in detail through above examples. Apparently, the present invention is not limited to the described examples. Those skilled in the art can also make various changes based on the examples of the present invention, but any change that is equivalent or similar to the present invention falls within the protection scope of the present invention.

What is claimed is:

1. A method for rapidly preparing a Prussian blue analogue with a monoclinic crystal structure, comprising the following steps:
    a) preparing a mixture of sodium ferrocyanide and sodium chloride as a raw material A;
    b) preparing a solution of manganous salt or ferrous salt as a raw material B;
    c) rapidly mixing the raw materials A and B with a micromixer, and conducting precipitation reaction to obtain a precursor slurry C;

d) aging the precursor slurry C obtained in step c) at 80° C. to 160° C. under a nitrogen or argon atmosphere for 3 min to 2 h to obtain an aged slurry; and e) filtering out precipitates from the aged slurry obtained in step d), and washing and drying the precipitates to obtain the Prussian blue analogue with a monoclinic crystal structure;

wherein in the raw material A, the mixture has a concentration of 0.05 mol/L to 1 mol/L of the sodium ferrocyanide, and a concentration of 0.5 mol/L to 6 mol/L of the sodium chloride, in the raw material B, the solution has a concentration of 0.05 mol/L to 3 mol/L of the manganous salt or the ferrous salt, the sodium ferrocyanide of the raw material A and the raw material B are used at a molar ratio of 1:(0.5-3), and the micromixer is selected from the group consisting of: a membrane dispersion micromixer, a microsieved micromixer, and a cocurrent microslot mixer.

2. The method according to claim 1, wherein the Prussian blue analogue with a monoclinic crystal structure has a chemical formula of $Na_xM[Fe(CN)_6]_y \cdot zH_2O$, wherein M=Mn or Fe, $1.5<x<2$, and $0.5<y<1$.

3. The method according to claim 1, wherein the manganous salt is one or a mixture of manganese chloride, manganese sulfate and manganese nitrate, and the ferrous salt is one or a mixture of ferrous chloride, ferrous sulfate and ferrous nitrate.

4. The method according to claim 1, wherein the obtained Prussian blue analogue with a monoclinic crystal structure has a particle diameter of 200 nm to 2,000 nm.

* * * * *